Sept. 9, 1958      P. J. H. SCHILS      2,851,071
COPYING SHAPER
Filed Aug. 5, 1955

INVENTOR
PETRUS J. H. SCHILS
BY Toulmin & Toulmin
ATTORNEYS

United States Patent Office 2,851,071
Patented Sept. 9, 1958

2,851,071
COPYING SHAPER

Petrus Johannes Hubertus Schils, Maastricht, Netherlands

Application August 5, 1955, Serial No. 526,610

Claims priority, application Netherlands
August 17, 1954

3 Claims. (Cl. 144—144)

The invention relates to a copying shaper or a such like milling or grinding machine, comprising means for feeding the work piece (blank) together with a pattern through the machine, the cutting tools of which being movably mounted on either side of the feeding path of the work piece.

In a machine of the type described the cutters are only capable of linear motion transversely of the feed direction of the work piece. This has the disadvantage that the treatment of parts of the profile of the work piece lying approximately transverse to the feed direction is liable to heavy resistance, if the machining is not impossible at all.

The invention has for its object to obviate said objection. This aim is attained in that both cutting tools are each mounted on a pivotal arm.

In a preferred embodiment of the machine according to the present invention both arms are resiliently connected to a travelling-block adapted to be displaced transversely to the feeding path. By this latter measure it is made possible to position the one cutting tool—seen in the feeding direction of the workpiece—before the other cutting tool, such that rounded front and rear parts of the workpiece may be completely machined without the one cutter interfering with the other.

The invention will be described more in detail with reference to the accompanying drawings, in which a number of elevations of a preferred construction of the copying machine according to the invention are illustrated diagrammatically.

Figure 1:
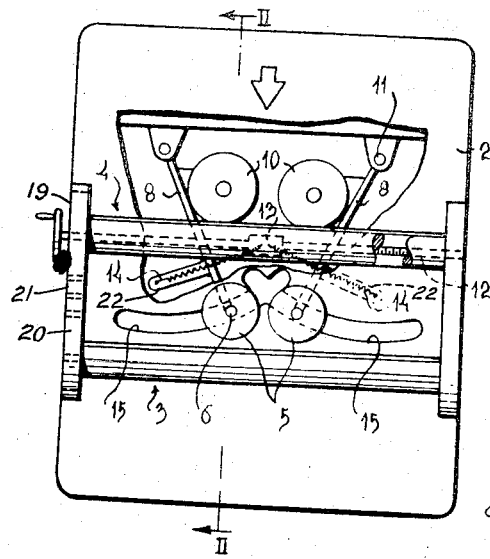
Fig. 1 is a top plan view of the machine.
Figure 2:
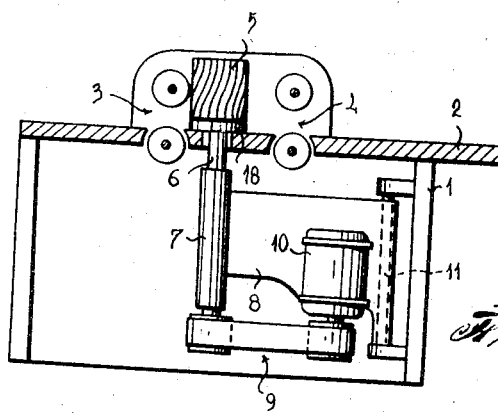
Fig. 2 is a side elevational view of the machine shown in Fig. 1.

On a frame 1 of the machine is provided a table 2. In the transverse direction, partly countersunk in the table, two sets of feeding rollers 3 and 4 are rotatably supported in bearings. On one side of the table a driving gears comprising the gears 19 and 20 on the rollers and idler gear 21 is mounted. Two cutters 5 in the form of cylindrical cutters extend above the table, between the two pairs of rollers. The cylindrical cutters are mounted on vertical shafts 6 extending through the table and supported below it in a bearing 7 of a swinging arm 8. At the lower end of the shaft 6 has been made a driving connection 9 with a motor 10 likewise mounted on the arm 8. Each arm 8 is adapted to pivot about a shaft 11 supported in bearings in the table 2 and the frame 1.

Provided on the lower side of the table, on a screw spindle 12, is a travelling block 13. Both arms 8 are connected with said block by means of a tension-spring 14, to enable the cylindrical cutters 5 to be moved towards one another. One end of each spring 14 is attached to the travelling block 13 and the other end is attached to a rigid extension 22 extending laterally from each of the pivotally mounted arms 8, as shown in Figure 1. By making these springs 14 as long as possible, it is possible to work narrower as well as large articles. In the table are two circular slots 15 for the passage of the shaft 6 and in order at the same time to enable the cylindrical cutters 5 to move laterally.

Figures 3, 4:
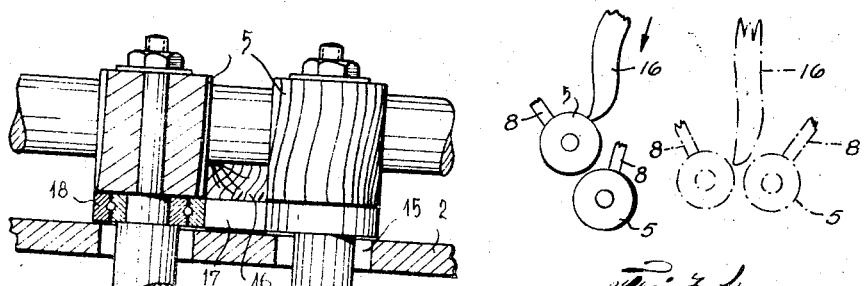
Fig. 3 is an elevational view in enlarged scale of the cutting tools to show the workpiece and pattern passing therebetween.
Fig. 4 is a top plan view showing the positions of the cutting tools when both cutting tools are displaced toward one side of the machine and the positions of the cutting tools when they are in their normal positions.

As may be seen from Fig. 3, the workpiece 16, lying on the pattern 17, is inserted between the first pair of rollers 3, after which the workpiece can be released. The pattern 17 comes into contact with a ring 18 (e. g. in the form of an outer ring of a ball bearing) disposed at the lower ends of the cylindrical cutters 5, by means of which the movement of the cutter is controlled.

In the operation of this machine, a pattern with the workpiece supported thereon is moved along the table 2 in the direction shown by the arrow between the cutting tools 5. The pattern will engage the rings 18 which are coaxially mounted with the respective cutting tools. The movement of the rings 18 will control the movement of the cutting tools so as to mill the workpiece into a shape which is a copy of the pattern which actuates the rings 18. The springs 14 will keep the rings in constant engagement with the pattern and consequently the cutting tools 5 will closely follow the contours of the pattern.

When the workpiece has a curved point as shown in Figure 4, the cylindrical cutters 5 will not be able to mill it completely without any further aids. With a view to this the travelling block 13 has been constructed to be movable in the transverse direction. As may be seen from Fig. 4, when said block is disposed to one side of the longitudinal axis of the table, one cylindrical cutter will lie slightly ahead of the other. For example when the travelling block is moved to the right, as viewed in Figure 1, the spring attaching the travelling block to the left arm 8 will pull that arm toward the right and inwardly along the left-hand arc 15. Concurrently therewith the right-hand arm 8 will be spring-urged to the right and outwardly along the right hand arc 15 by the action of the right hand spring 14. Also this movement may occur either by direct contact between the rings 18, or by indirect contact through the intermediary of the pattern 17. Thus, movement of the travelling block in a transverse direction will result in both of the cutting tools being moved in the same direction and the tools being positioned one in advance of the other such as shown in Figure 4. The workpiece 16 can now be moved longitudinally in the direction of the axis of the rearmost cylindrical cutter taken along the direction of movement of the workpiece. Thus it is possible to mill also the extreme point of the workpiece during the traverse and to mill underneath the point by the foremost cutter to obtain the curved shape illustrated in Figure 4. It can be seen that to obtain this shape the cutting edges of the cutters must be on opposite sides of the longitudinal axis of the table from that shown in Figure 1.

By means of the movable disposition of the cylindrical cutters it is possible to mill workpieces of the most varied shapes in one traverse. Thus rectangular objects can be passed through the machine in a diagonal direction or at an angle to the longitudinal axis of the table.

What I claim is:

1. A copying shaper or a such like milling or grinding machine comprising means for feeding a workpiece and a pattern through the machine, an arm pivotally mounted on each side of the feeding path of said machine, a cutting tool mounted on each pivotally-mounted arm so as to be positioned on each side of the feeding path of the workpiece, and means displaceable in a direction transversely of said machine and interconnected with said pivotally mounted arms for simultaneously spring-urging both cutting tools in the same transverse direction.

2. A copying shaper comprising means for feeding a workpiece and a pattern through the machine, an arm pivotally mounted on each side of the feeding path of said machine, a cutting tool mounted on each pivotally-mounted arm so as to be positioned on each side of the feeding path of the workpiece, a travelling block, means for displacing said travelling block transversely with respect to said feeding path, and means for resiliently connecting said arms to said travelling block whereby transverse movement of said travelling block will move both cutting tools in the same transverse direction.

3. A copying shaper comprising a horizontally-extending worktable, means for feeding a workpiece and a pattern upon said table and through said machine, a pair of pivotally mounted arms each having one end mounted on a side of the feeding path of said machine, a cutting tool mounted on the free end of each of said pivotally-mounted arms, a travelling block normally positioned on the longitudinal axis of said table, means for displacing said travelling block transversely with respect to said feeding path, and resilient means connecting said pivotally-mounted arms to said travelling block whereby said cutting tools are disposed on each side of the longitudinal axis of said table when said travelling block is positioned on the longitudinal axis of said table.

References Cited in the file of this patent

UNITED STATES PATENTS

| | | |
|---|---|---|
| 1,839,196 | Cameron | Jan. 5, 1932 |
| 1,966,869 | Owen | July 17, 1934 |
| 2,361,820 | Cromwell | Oct. 31, 1944 |